April 16, 1946. W. P. ROBINSON 2,398,720
TWO-SPEED POWER TRANSMISSION
Filed Feb. 24, 1945

Inventor:—
William P. Robinson
by his Attorneys
Howson & Howson

Patented Apr. 16, 1946

2,398,720

UNITED STATES PATENT OFFICE 2,398,720

TWO-SPEED POWER TRANSMISSION

William P. Robinson, Narberth, Pa.

Application February 24, 1945, Serial No. 579,595

4 Claims. (Cl. 74—281)

This invention relates to power transmitting devices, and particularly to two-speed arrangements for driving disc-supporting turntables of sound recording and reproducing devices and the like, where a change from high speed to low speed, and vice versa, may be readily accomplished at any time during normal rotation of the turntable at either speed.

Figure 1:
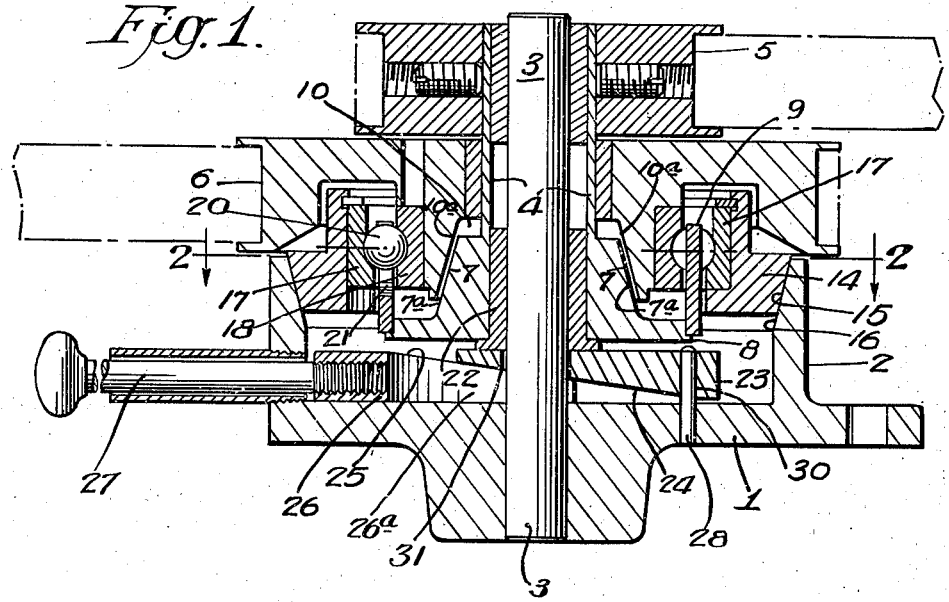
Figure 2:
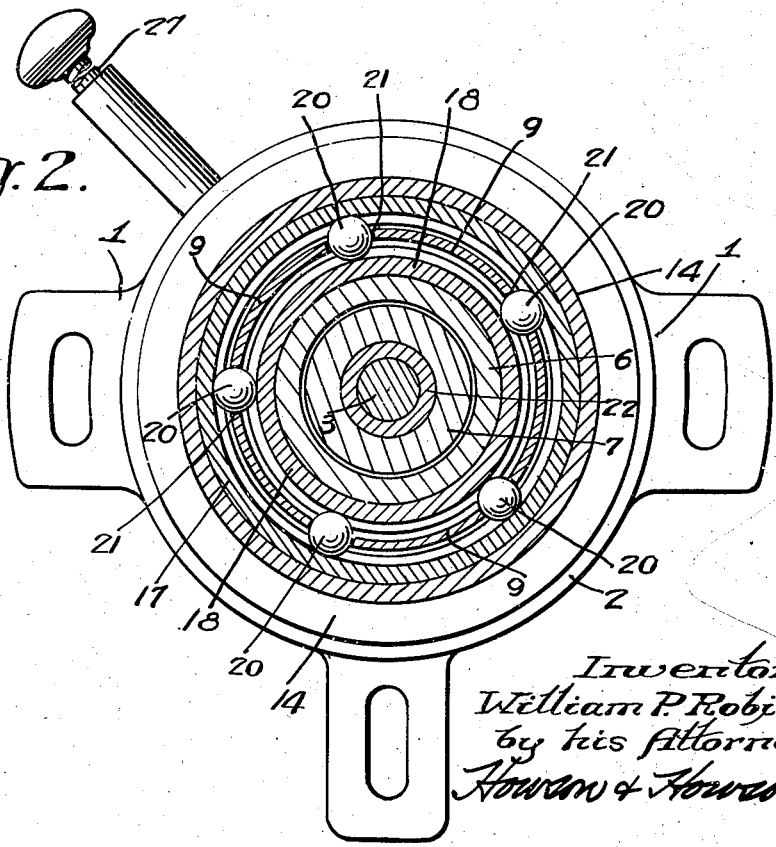

In the accompanying drawing:

Fig. 1 is a vertical sectional elevation of the device, shown as operating at low speed; and Fig. 2 is a sectional plan view taken on the line 2—2, Fig. 1.

The device comprises a base structure 1 which is provided with an annular upright flange 2, positioned concentric to a vertical spindle 3 which is rigidly supported at its lower end in the base structure 1.

Rotatably mounted on the spindle 3 is a sleeve 4, to the upper end of which is rigidly secured a flanged or grooved power take-off pulley 5; and freely rotatably mounted on the sleeve 4, directly below the take-off pulley 5, is a flanged or grooved power input pulley 6.

The lower end of the sleeve 4 is provided with a frusto-conical hub 7 having a flange 8 at its extreme lower end, which is of enlarged diameter, and on the periphery of which is secured a deep ring 9 coaxially disposed with respect to the sleeve 4 and spindle 3.

The frusto-conical hub 7 of the sleeve 4 is positioned within a correspondingly shaped recess 10 formed in the lower side of the power input pulley 6, with the conical surfaces 7a and 10a of the hub 7 and recess 10 respectively in adjacent concentric relation to each other.

Within the upright annular flange 2 of the base structure 1, concentric thereto and to the spindle 3, sleeve 4, hub 7 and recess 10 of the pulley 6, is a brake ring 14. This ring is provided with an inverted frusto-conical surface 15 which is adapted to cooperate and make contact with a similar frusto-conical surface 16 formed on the inside of the vertical flange 2 immediately adjacent the upper edge thereof.

The brake ring 14 and the power input pulley 6 are provided with complementary right-angularly shouldered recesses into which are tightly fitted the outer and inner races 17 and 18 respectively of a ball-bearing unit, the balls 20, 20 of which fit the races snugly and are circumferentially or angularly spaced, as shown in Fig. 2.

The balls 20 fit snugly but rotatably within vertical recesses 21, 21 formed in the ring 9 which is carried by the flange 8 of the sleeve 4 said ring 9 being disposed concentrically between the ball races 17 and 18, as shown in the drawing.

The lower end of the sleeve 4 is provided with a flanged bushing 22 having its lower end surface resting on a horizontally arranged wedge element 23, which latter has an inclined under surface 24 cooperating with an upper inclined surface 25 of a second wedge element 26.

The wedge element 26 is slotted at 26a to fit around the spindle 3 and is adapted to be moved horizontally on and with respect to the base 1, by any suitable means, such as a manually operable push-pull rod 27, which extends horizontally through and outwardly beyond the flange 2 of the base structure 1.

The wedge element 24 is held against horizontal movement but is permitted free vertical movement by an anchor pin 28 which slidably fits into a hole 30 formed in the wedge element 23. The wedge element 23 is also provided with an orifice 31 through which the spindle 3 projects freely.

As shown in Fig. 1, the complementary conical surfaces 15 and 16 of the brake ring 14 and base structure flange 2 are in firm contact, which holds the outer ball race 17 stationary; and the balls 20, 20 through the inner ball race 18, supports the power input pulley 6 for free rotation.

As the pulley 6 is rotated under power, it rotates the inner ball race 18 about the axis of the spindle 3. Rotation of the inner ball race 18 causes the balls 20, 20 to roll in the outer fixed ball race 17 and thereby travel circumferentially about the axis of the spindle 3. The circumferential traveling of the balls 20, 20 about the axis of the spindle 3 causes the ring 9, sleeve 4 and power output pulley 5 to rotate about the axis of the spindle 3 at one predetermined speed.

If it is desired to increase the speed of the power output pulley 5, the control rod 27 is pushed inwardly, which causes the wedge 26 to lift the wedge 23. The wedge 23, working against the lower end of the sleeve 4, lifts the sleeve 4 axially until the frusto-conical surface 7a of the sleeve hub 7 engages the frusto-conical surface 10a of the recess 10 in the power input pulley 6, which couples the sleeve 4 directly to the power input pulley 6 and forms a direct high speed drive from the input pulley 6 to the output pulley 5, through the sleeve 4.

At the same time, substantially, as the direct drive surfaces 7a and 10a become effective, continued axial lifting of the sleeve 4, by the control wedges 23—26, raises the brake ring 14 sufficiently to disengage the frusto-conical surface 15 of the brake ring 14 from the frusto-conical surface 16 of the fixed annular flange 2 of the base structure 1 thus releasing the rotary elements of the entire unit to revolve freely about the axis of the spindle 3, supported solely by the control wedges 23—26.

Return to low speed rotation of the power output pulley 5 can be instantaneously obtained merely by pulling the control rod 27 outwardly and thereby moving the wedge 26 relative to the wedge 23, whereby the sleeve 4 is permitted to descend by gravity until the frusto-conical brake surface 15 of the brake ring 14 contacts the frusto-conical brake surface 16 of the fixed annular flange 2 of the base structure 1; whereupon further descent of the sleeve 4 disconnects the frusto-conical clutch surface 7a of the sleeve hub 7 from the frusto-conical clutch surface 10a of the power input pulley 6.

The outer ball race 17 ceases to rotate and the balls 20 start their rolling planetary advancing movement about the axis of the spindle 3, due to their frictional surface engagement with the stationary race 17. The balls 20 then drag their trap ring 9, and consequently the sleeve 4 and output pulley 5 about the axis of the spindle 3 at a speed lower than obtained by the aforesaid direct drive between the pulleys 6 and 5.

I claim:

1. A power transmitting device comprising coaxial rotary power-input and power-output members, a coaxial brake ring, stop means engageable with said brake ring, inner and outer ball races respectively carried by said input member and said brake ring, complementary balls between and in rolling contact with said races, a coaxial drive ring intermediate said races and recessed to receive and space said balls, a coaxial element rigidly connecting said output member and said drive ring, complementary clutch faces carried by said input member and said connecting element, and means for shifting said connecting element axially to alternately engage and disengage said clutch faces and concurrently therewith effect disengagement and engagement between said brake ring and said stop means.

2. A power transmitting device comprising a base structure, an annular flange on said base structure, coaxial rotary power-input and power-output members, a coaxial brake ring, stop means comprising complementary frusto-conical brake surfaces on said annular flange and said brake ring, inner and outer ball races respectively carried by said input member and said brake ring with complementary balls between and in rolling contact with said races, a coaxial drive ring intermediate said races and recessed to receive and space said balls, a coaxial element rigidly connecting said output member and said drive ring, complementary clutch faces carried by said input member and said connecting element, and means for shifting said connecting element axially to alternately engage and disengage said clutch faces and concurrently therewith effect disengagement and engagement between said brake surfaces.

3. A power transmitting device comprising a base structure, coaxial rotary power-input and power-output members, a coaxial brake ring, stop means engageable with said brake ring, inner and outer ball races respectively carried by said input member and said brake ring, complementary balls between and in rolling contact with said races, a coaxial drive ring intermediate said races and recessed to receive and space said balls, a coaxial element rigidly connecting said output member and said drive ring, complementary clutch faces carried by said input member and said connecting element, an inclined cam faced member movable transversely to said connecting element, and means engageable with said cam faced member and said connecting element for shifting said connecting element axially to alternately engage and disengage said clutch faces and concurrently therewith effect disengagement and engagement between said brake ring and said stop means.

4. A power transmitting device comprising a base structure, coaxial rotary power-input and power-output members, a coaxial brake ring, stop means engageable with said brake ring, inner and outer ball races respectively carried by said input member and said brake ring, complementary balls between and in rolling contact with said races, a coaxial drive ring intermediate said races and recessed to receive and space said balls, a coaxial element rigidly connecting said output member and said drive ring, complementary clutch faces carried by said input member and said connecting element, a wedge member underlying said connecting element, means affording vertical movement of said wedge member while preventing horizontal movement thereof, and a second wedge member slidably mounted on said base structure beneath the first said wedge member and engageable therewith for shifting said connecting element axially to alternately engage and disengage said clutch faces and concurrently therewith effect disengagement and engagement between said brake ring and said stop means.

WILLIAM P. ROBINSON.